(12) United States Patent
LaRossa et al.

(10) Patent No.: US 6,611,627 B1
(45) Date of Patent: Aug. 26, 2003

(54) DIGITAL IMAGE PROCESSING METHOD FOR EDGE SHAPING

(75) Inventors: Gina N. LaRossa, Rochester, NY (US); Hsien-Che Lee, Penfield, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/556,666

(22) Filed: Apr. 24, 2000

(51) Int. Cl.$^7$ ................................................. G06K 9/36
(52) U.S. Cl. ....................... 382/240; 382/254; 382/274
(58) Field of Search ................................. 382/240, 274, 382/254, 199, 224, 131, 132, 248, 276; 706/20; 348/125

(56) References Cited

U.S. PATENT DOCUMENTS

| | | | |
|---|---|---|---|
| 5,467,404 A | 11/1995 | Vuylsteke et al. | 382/274 |
| 5,717,791 A | 2/1998 | Labaere et al. | 382/274 |
| 5,754,697 A | * 5/1998 | Fu et al. | 382/232 |
| 5,761,341 A | * 6/1998 | Go | 382/232 |
| 5,963,676 A | 10/1999 | Wu et al. | 382/274 |
| 6,005,983 A | 12/1999 | Anderson et al. | 382/254 |
| 6,285,798 B1 | * 9/2001 | Lee | 382/260 |

OTHER PUBLICATIONS

"Characterization of Signals from Multiscale Edges" by Stephane Mallat and Sifen Zhong. IEEE Transactions on Pattern Analysis and Machine Intelligence, vol. 14, No. 7, Jul. 1992.

"A Computational Approach to Edge Detection" by John Canny. IEEE Transactions on Pattern Analysis and Machine Intelligence, vol. PAMI–8, No. 6, Nov. 1986.

"Detecting Boundaries in a Vector Field" by Hsien–Che Lee and David R. Cok. IEEE Transactions on Signal Processing, vol. 39, No. 5, May 1991.

"Contrast enhancement of medical images using multiscale edge representation" by Jian Lu; Dennis M. Healy, Jr.; John B. Weaver. "Optical Engineering". Jul. 1994, vol. 33, No. 7, pp. 2151–2161.

"Multiscale Image Contrast Amplification (MUSICA)" by Pieter Vuylsteke and Emile Schoeters. SPIE vol. 2167, "Image Processing" (1994), pp. 551–560.

* cited by examiner

Primary Examiner—Anh Hong Do
(74) Attorney, Agent, or Firm—David M. Woods (57) ABSTRACT

A digital image processing method, includes the steps of: transforming the digital image using an edge sensitive wavelet transform to produce a plurality of wavelet coefficients at various resolutions and a residual image; modifying the wavelet coefficients as a function of the image gradient and its rate of change at a resolution corresponding to the respective wavelet coefficient; and inverse transforming the modified wavelet coefficients and the residual image to produce a processed digital image.

10 Claims, 8 Drawing Sheets

DIGITAL IMAGE PROCESSING METHOD FOR EDGE SHAPING

FIELD OF THE INVENTION

This invention relates to digital image processing methods for improving the apparent sharpness of images. In particular, the invention is directed to a class of such methods known as edge reconstruction. The invention can be used in various applications where image signals are processed and displayed or printed, such as in digital printing, photofinishing, medical imaging, video imaging, motion pictures, and graphic arts.

BACKGROUND OF THE INVENTION

Many factors degrade image sharpness during their capture and display processes. For example, focus error and camera shake cause image blur in the capture process, and the non-ideal system transfer functions of monitors or printers cause image blur in the display process. Prior art techniques for deblurring an image and enhancing its sharpness roughly fall into four main approaches: unsharp masking, inverse filtering, local histogram modification, and edge reconstruction. Unsharp masking works by decomposing an input image into a low frequency component and a high frequency component. The latter is then amplified and added back to the low frequency component to create a sharper-appearing output image. The inverse filtering approach is aimed at explicitly reversing the blurring process by applying a filtering operation which is an inverse of the image blurring operation. Because of its sensitivity to noise, inverse filtering is often applied with some smoothness constraint on the output image signal. The local histogram modification method is based on the idea that if the gray level differences among neighboring pixels are stretched out by modifying the histogram of a local window, the contrast of the image details will be more visible and the image will appear sharper. The edge reconstruction method extracts edge information from an input image at many spatial scales. At each scale, the edges are manipulated to enhance their sharpness. The final output image is then reconstructed from the modified edge signals.

U.S. Pat. No. 6,005,983 teaches an edge reconstruction method of image enhancement based on a Laplacian pyramid. At each resolution, the Laplacian of the image signal is clipped and then processed through a high-pass filter to sharpen the Laplacian response. The output image is reconstructed from the modified Laplacian pyramid. One drawback with this technique is that the Laplacian is sensitive to noise. Furthermore, because clipping affects every spatial frequency, it is difficult to control the way edges are sharpened in the high-pass filtering.

U.S. Pat. No. 5,963,676 teaches a method of image enhancement by a different implementation of the Laplacian pyramid. An input image is filtered with a series of low-pass filters. At each filter output, four one-dimensional Laplacian operators at different angles are applied to the low-passed image signal. The Laplacian response (unsharp masked signal) is then amplified through a nonlinear function and then added to the input image to create sharper-appearing edges. The nonlinear function has an upper clipping limit, a lower undershoot limit, and a middle linear-gain range. For its intended application in x-ray angiography, the linear gain is set very high so that the directional Laplacian can pick up very fine vessel structures and render them with very high contrast. The method is obviously designed for x-ray angiography for its emphasis on curve structures, but not for other types of edge or texture. Adding the Laplacians of an image to enhance the image sharpness is basically an unsharp masking approach and suffers from the problems of creating overshoots along edges and failing to differentiate between different types of edges, such as texture, shading and occlusion boundaries in an image.

Mallat and Zhong teaches a method of edge-wavelet multiresolution analysis for image representation and compression in their paper, "Characterization of signals from multiscale edges," published in *IEEE Transactions on Pattern Analysis and Machine Intelligence*, 14, 7, 710–732, 1992. Image compression is achieved in their work by finding and keeping only the local extrema in their edge-wavelet coefficients. Finding local extrema of image gradients as an edge detector is commonly known as Canny's edge detector proposed by F. Canny, in his paper, "A computational approach to edge detection," *IEEE Transactions on Pattern Analysis and Machine Intelligence*, vol. PAMI-8, 6, 679–698, November 1986. Mallat and Zhong also teaches a method of image reconstruction from edge-wavelet extrema by iterative projection onto feasible solution sets. The iterative projection method is too computationally intensive, and hence too time-consuming to be of practical use on commonly available image processing computers such as personal computers. It currently takes several hours to process a single image using the iterative projection method.

Lu, Healy, and Weaver teach a method of image enhancement by increasing the amplitude of the edge-wavelet coefficients at the local extrema in their paper, "Contrast enhancement of medical images using multiscale edge representation," published in *Optical Engineering*, 33, 7, 2151–2161, 1994. Their method relies on an iterative projection based on the self-reproduction kernel corresponding to the edge-wavelet. This approach requires a large amount of computation and on relatively low speed image processing hardware, such as a personal computer, it is very slow because it takes several long iterations for the algorithm to converge. Another weakness of this method is that the same gradient amplification factor is applied to all edges, independent of the edge properties. As a consequence, edges corresponding to noise and shading are enhanced as well as those corresponding to object boundaries and other discontinuities.

Vuylsteke and Schoeters also teach a method of contrast enhancement in their paper, "Multiscale image contrast amplification," published in *SPIE Proceedings*, Volume 2167, 551–560, 1994. Their method uses a power function for amplifying the edge contrast.

U.S. Pat. No. 5,717,791 teaches a method of image contrast enhancement based on the combination of Mallat and Zhong's edge-wavelet transform and Lu, Healy, and Weaver's idea of amplifying wavelet coefficients. A constraint is imposed on the amplification factor such that the factor is a function of the average wavelet maxima. The larger wavelet coefficients get amplified less than the smaller wavelet coefficients. The motivation was to amplify the low contrast edges more than the high contrast edges. However, the amplitude of wavelet coefficient is not an intrinsic edge property, because it depends on the image metric. For example, when a digital image is scaled up by a factor of 10, all the wavelet coefficients are also scaled up by a factor of 10. Therefore, wavelet amplitudes alone do not specify the nature of the edges. This reconstruction transform is also slow when implemented on relatively low speed computers because of its iterative processes.

In summary, the prior edge reconstruction methods for image enhancement suffer from two common drawbacks: (1) the iterative reconstruction process is too slow, and (2) the amplification of the edge contrast does not take into account the intrinsic properties of the edge. There is a need therefore for an improved method of image processing using edge reconstruction to enhance the appearance of the image that avoids these problems of the prior art.

SUMMARY OF THE INVENTION

The need is met according to the present invention by providing a digital image processing method that includes the steps of: transforming the digital image using an edge sensitive wavelet transform to produce a plurality of wavelet coefficients at various resolutions and a residual image; modifying the wavelet coefficients as a function of the image gradient and its rate of change at a resolution corresponding to the respective wavelet coefficient; and inverse transforming the modified wavelet coefficients and the residual image to produce a processed digital image.

One advantage of this invention is to greatly increase the speed of computation in the edge reconstruction method by computing a wavelet coefficient-scaling mask for modifying wavelet coefficients at each resolution. A factor of 20 reduction in processing time has been achieved with the present invention. Another advantage of this invention is to improve the sharpness of an image by modifying edge contrast according to its spatial extent as measured by the gradient curvature. Therefore, fine textures are sharpened differently than step edges. The resulting images appear naturally sharp because the sharpening process based on gradient curvature is derived from physical models of image blur.

DETAILED DESCRIPTION OF THE INVENTION

In the following description, a preferred embodiment of the present invention will be described as a software program. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components and elements known in the art. Given the method as described according to the invention in the following materials, software not specifically shown or described herein that is useful for implementation of the invention is conventional and within the ordinary skill in such arts.

Still further, as used herein, the software program may be stored in a computer readable storage medium, which may comprise, for example; magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Before describing the present invention, it facilitates understanding to note that the present invention is preferably utilized on any well-known computer system, such a personal computer. Consequently, the computer system will not be discussed in detail herein. It is also instructive to note that the images are either directly input into the computer system (for example by a digital camera) or digitized before input into the computer system (for example by scanning an original, such as a silver halide film).

The basis of the preferred embodiment of this invention is built on Canny's edge detector as used in Mallat and Zhong's edge-wavelet transform. The details of theoretical derivation and practical implementation can be found in the papers cited above. It is understood that other edge detectors or multiresolution analysis can also be used. The following description contains the preferred embodiment of the method of modifying the wavelet coefficients according to edge properties. The reconstruction of the edge-enhanced image is a one-shot process without any iteration.

Figure 1:
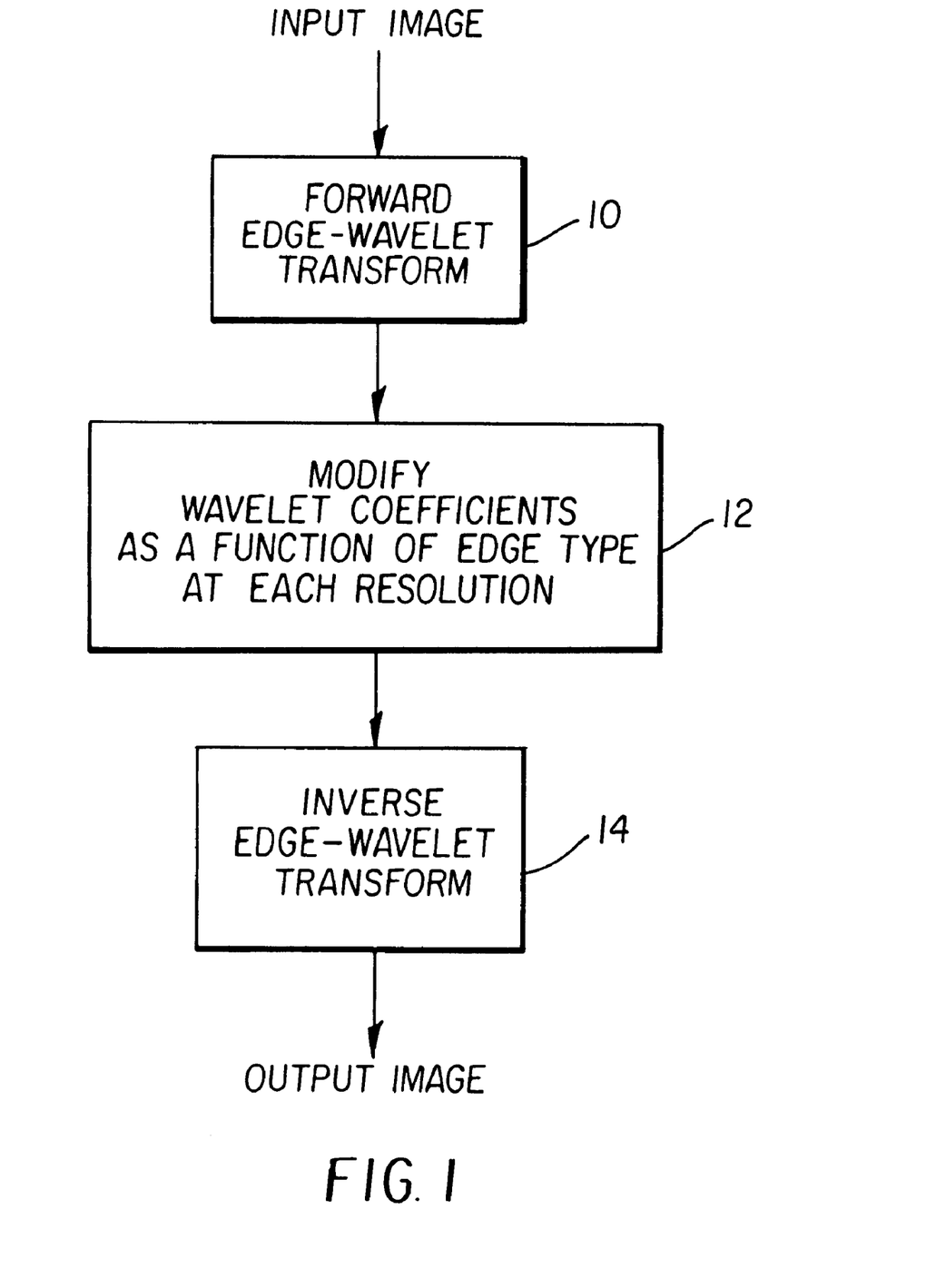
FIG. 1 is a block diagram showing the prior art edge wavelet transform employing a modification of the wavelet coefficients according to the present invention.

Referring to FIG. 1, the first step in the present invention is to transform (10) the digital image using an edge sensitive wavelet transform to produce a plurality of wavelet coefficients at various resolutions and a residual image, by applying a forward edge-wavelet transform to an input image, $B_0(x,y)$ to compute its first partial derivatives, $H_i(x,y)=\partial B_{i-1}(x,y)/\partial x$ and $V_i(x,y)=\partial B_{i-1}(x,y)/\partial y$, at several spatial resolution, $i=1, 2, \ldots, N$, and where $B_i$ is a blurred version of $B_{i-1}$. Note that the wavelet coefficients are the partial derivatives. Next, the partial derivatives (wavelet coefficients) are modified (12) as a function of the image gradient and its rate of change at a resolution corresponding to the respective wavelet coefficient by a wavelet coefficient-scaling mask to produce new partial derivatives, $H_i'$ and $V_i'$. Finally, the modified wavelet coefficients $H_i'$ and $V_i'$ and the residual image are inverse transformed (14) to produce a processed digital image.

To perform the forward edge-wavelet transformation step (10), the first order partial derivatives, $H_i(x,y)$ and $V_i(x,y)$, of an input image at several spatial resolutions, $i=1, 2, \ldots, N$, are computed by way of an edge-wavelet transform. The best number of resolution levels, N, depends on the requirement of each application. A typical value of N is about 3 or 4. A preferred edge wavelet transformation is described by Mallet and Zhong in the reference cited above. An image gradient amplitude $G_i(x,y)$ is then computed from the first partial derivatives as $G_i=\sqrt{H_i^2+V_i^2}$. A binary edge map at each spatial resolution, i, is generated from the directional local maxima of image gradient at that resolution. For each image resolution i, an image gradient histogram is used to generate an attenuation factor table, which contains the attenuation factor, $f^a$, as a function of image gradient $G_i$. The rate of change in image gradient is referred to herein as the image gradient curvature. The image gradient curvature, $C_i(x,y)$, at each edge pixel is computed by applying a Laplacian operator on the image gradient, and then normalizing it with the gradient value, i.e., $C_i(x,y)=|\nabla^2 G_i(x,y)|/G_i(x,y)$. A boost factor table, which contains the boost factor,$f_b$, as a function of image gradient curvature $C_i$, is generated from user specified parameters.

To perform the wavelet coefficient modification, the attenuation table and the boost table are then applied to the edge map and the image gradient to produce a wavelet coefficient-scaling mask, $m_i(x,y)$. The first partial derivatives (wavelet coefficients) $H_i(x,y)$ and $V_i(x,y)$, are multiplied with the wavelet coefficient-scaling mask $m_i(x,y)$ to produce the new first partial derivatives (modified wavelet coefficients), $H_i'(x,y)=m_i(x,y)\cdot H_i(x,y)$ and $V_i'(x,y)=m_i(x,y)\cdot V_i(x,y)$. The output image is then reconstructed from the new $H_i'$ and $V_i'$, i=1, 2, ..., N, by way of the inverse wavelet transform.

Figure 2A:
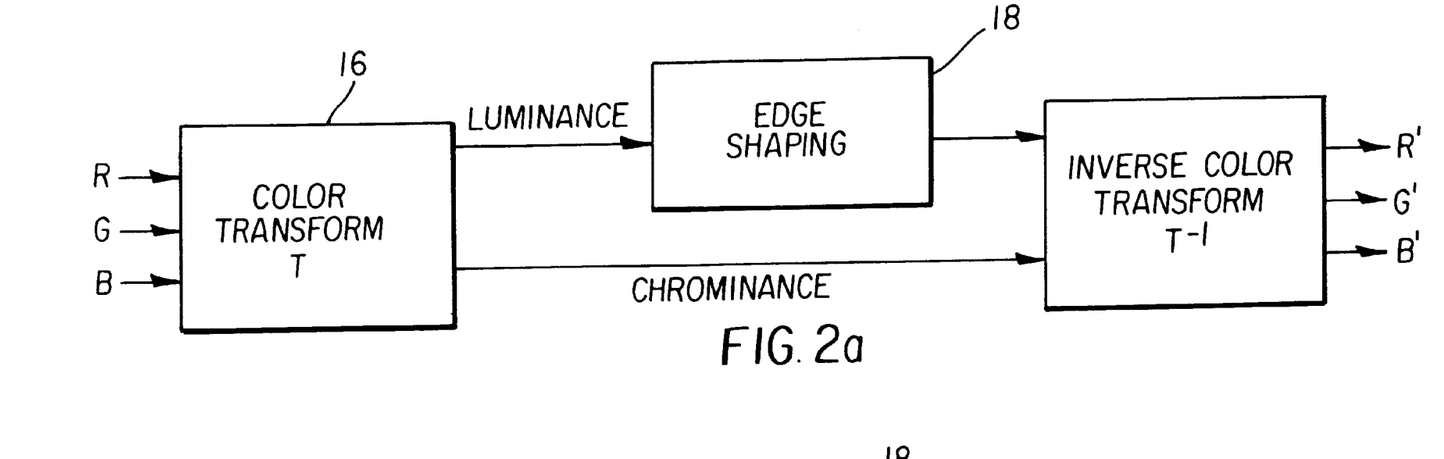
FIGS. 2a–b show ways of applying the present invention to a luminance channel and to all color channels of an image respectively.

Referring to FIGS. 2(a) and 2(b), a color image is often expressed in three or more color records (e.g. R,G,B). In most applications, an input color image can be transformed (16) into one luminance component and two chrominance components. In order to reduce computing time, the present invention can be applied (18) only to the luminance component to produce an edge shaped luminance component as shown in FIG. 2(a). The edge shaped luminance component and the chrominance components are then inverse transformed (20) to produce the processed image R'G'B'.

Figure 2B:
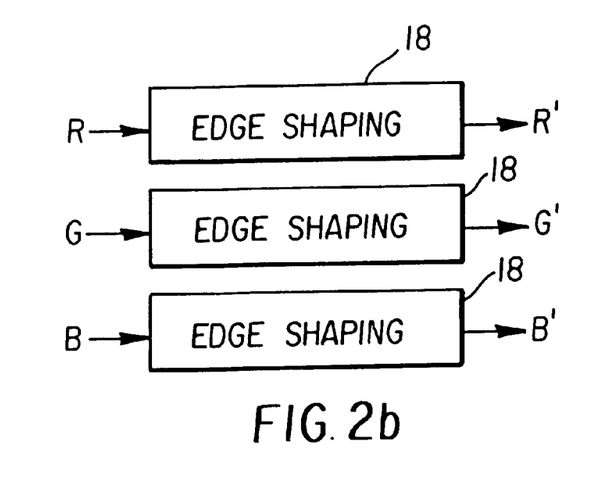

When color noise is severe or better image quality is desired, the edge shaping method (18) can be applied independently to each of the input color records (R,G,B), to produce a processed image (R',G',B')as shown in FIG. 2(b).

Figure 3:
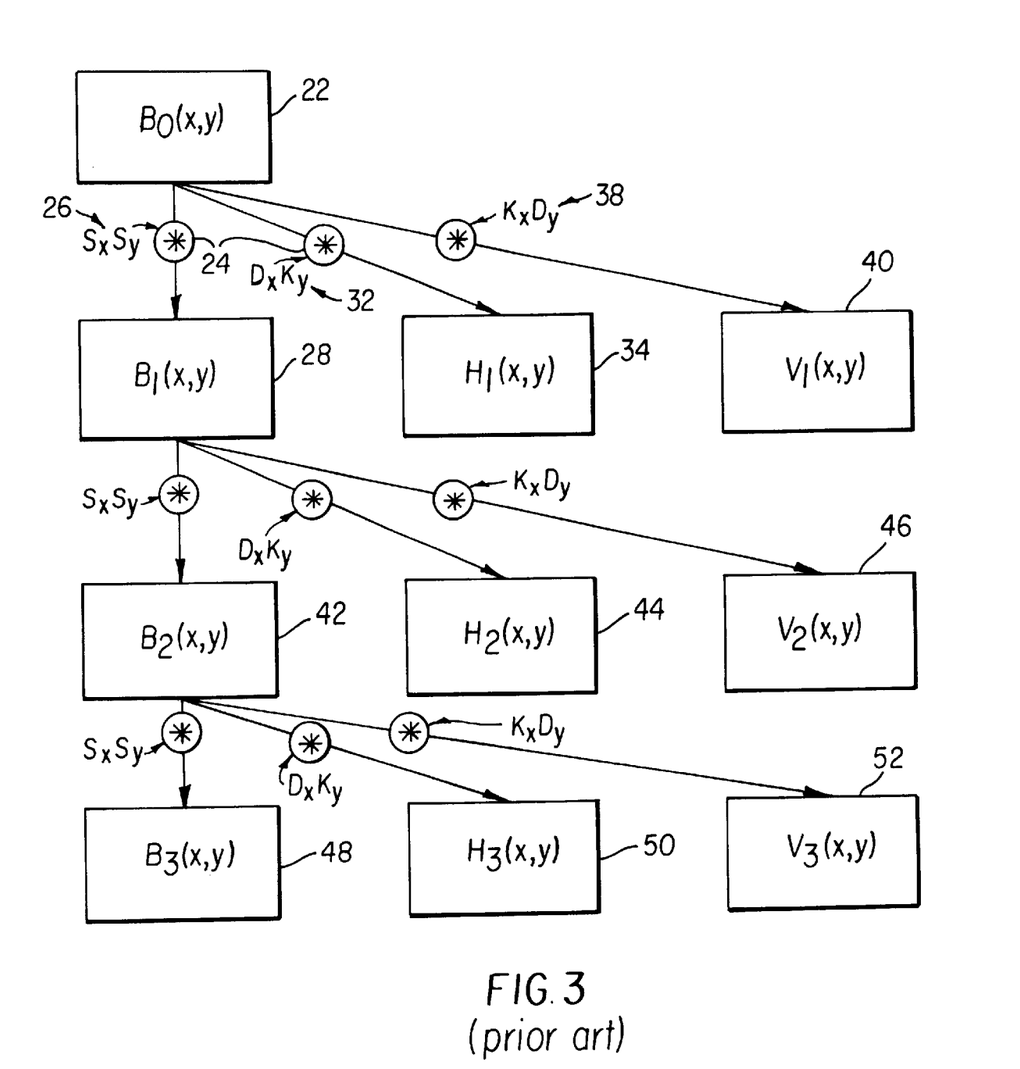
FIG. 3 is a block diagram showing the prior art forward edge-wavelet transform employed in the present invention.

Referring to FIG. 3, the forward edge-wavelet transform will be described. All the filters used in the wavelet transforms in the preferred embodiment are all x-y separable and therefore, they are written with the subscripts x or y, depending on which direction the filter is applied. First, the input image $B_0(x,y)$ 22 is convolved 24 with smoothing filters $S_xS_y$ (designated H by Mallat and Zhong in Table 1 of Appendix A) 26 to produce a once blurred version of the input image, $B_1(x,y)$ 28. A suitable smoothing filter is described in the Mallat and Zhong reference. The input image is also convolved with a differentiation filter $D_xK_y$ (designated G by Mallat and Zhong) 32 to produce a horizontal partial derivative $H_1(x,y)$ (designated $W_1^1$ by Mallat and Zhong) 34 and is convolved with a differentiation filter $K_xD_y$ (designated G by Mallat and Zhong) 38 to produce a vertical partial derivative $V_1(x,y)$ (designated $W_1^2$ by Mallat and Zhong) 40. $H_1(x,y)$ and $V_1(x,y)$ are the horizontal (x) and the vertical (y) partial derivatives (wavelet coefficients) of the input image at the finest resolution 1. The process then is repeated using $B_1(x,y)$ 28 in the place of the input image. The same filters are used, but the convolution is done by skipping every other pixel, thus reducing the resolution to produce a further blurred image $B_2(x,y)$ 42, horizontal and vertical wavelet coefficients $H_2(x,y)$ 44, and $V_2(x,y)$ 46 of the once blurred image. After $B_2(x,y)$ 42, $H_2(x,y)$ 44, and $V_2(x,y)$ 46 are computed, the same processes are repeated again, but the filter convolution 24 is done on every 4th pixel to produce a residual image $B_3(x,y)$ 48, and horizontal and vertical wavelet coefficients $H_3(x,y)$ 50, and $V_3(x,y)$ 52 of the twice blurred image. Each time, a coarser resolution is computed, the convolution kernels are the same, but the pixel intervals are increased by a factor of 2. This is equivalent to the process of adding zeros into the convolution kernel as described by Mallat and Zhong. This process may be repeated three or more times depending on the desired subtlety in edge shape modification that one may desire.

Figure 4:
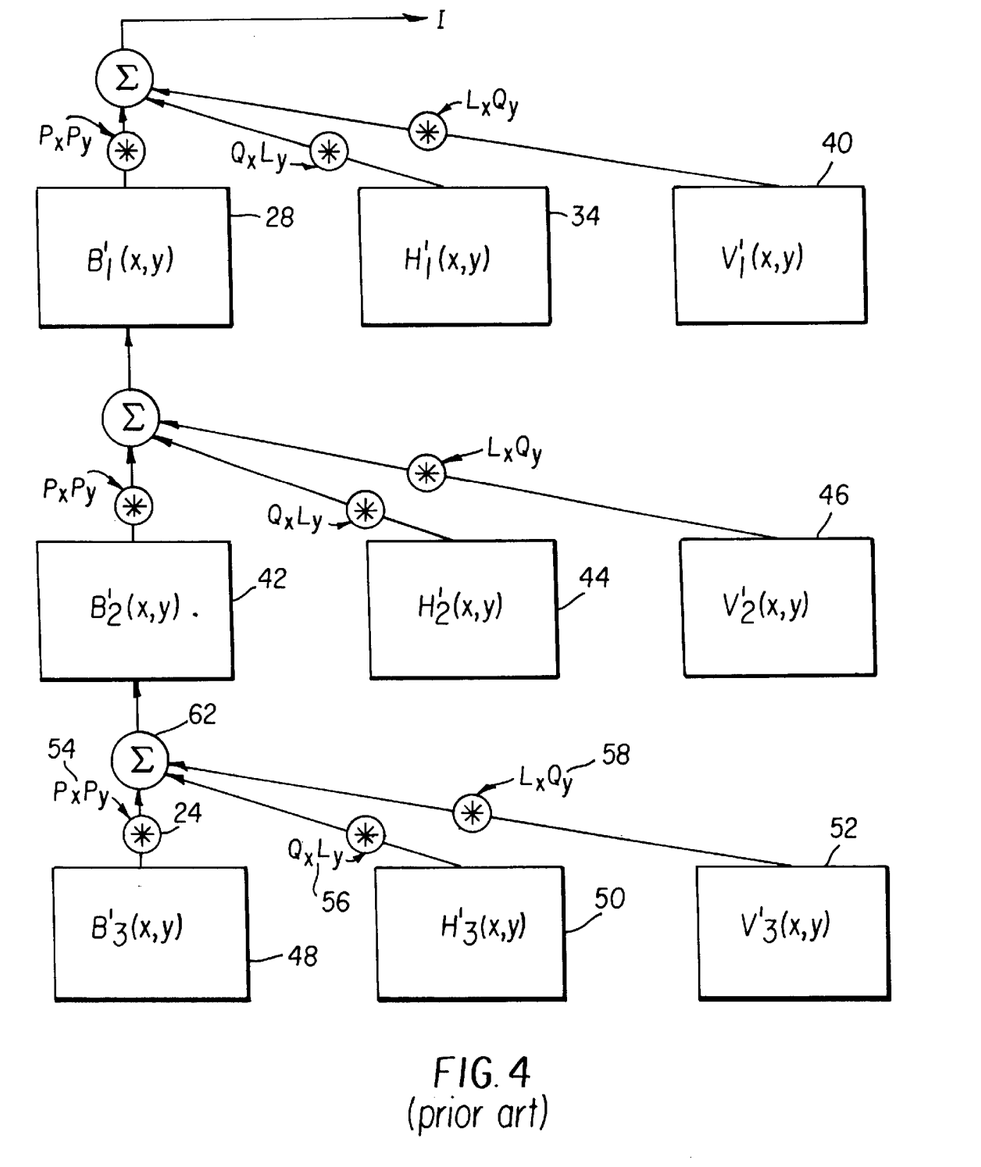
FIG. 4 is a block diagram showing the prior art inverse edge-wavelet transform employed in the present invention.

Referring to FIG. 4 the inverse edge-wavelet transform will be described. The reconstruction of the image to produce an edge sharpened image starts with the lowest resolution blurred image (the residual image) $B_3(x,y)$ 48, and first partial derivatives (wavelet coefficients), $H_3(x,y)$ 50 and $V_3(x,y)$ 52. Each of them is filtered with a different reconstruction filter, $P_xP_y$ (designated H by Mallat and Zhong) 54, $Q_xL_y$ (designated KL by Mallat and Zhong) 56 and $L_xQ_y$ (designated LK by Mallat and Zhong) 58, respectively, by convolution 24 with the respective reconstruction filter. The filtered results are summed together 62 to produce an edge sharpened version of the blurred image at level 2, $B_2'(x,y)$. At level 3, the convolution is computed by multiplying the kernel element with every 8th pixel in the image being convolved.

As is shown in FIG. 4, the same process is repeated until the output image is reconstructed at the finest resolution. For each level up, the convolution pixel interval is decreased by a factor of 2. The convolution pixel interval corresponds to the number of zeros that are inserted into the values in the convolution kernel. It should be apparent that if $B_3'(x,y)$ and all the partial derivatives (wavelet coefficients $H_i'$ and $V_i'$) are unmodified, i.e., $B_3'(x,y)=B_3(x,y)$, $H_i'=H_i$, $V_i'=V_i$, the reconstructed image will be the identical to the input image.

In the preferred embodiment of the invention, the filters shown in FIG. 3 and FIG. 4 are chosen to have the following kernels:

| n | −4 | −3 | −2 | −1 | 0 | 1 | 2 | 3 | 4 |
|---|---|---|---|---|---|---|---|---|---|
| 16 * S(n) | 0 | 0 | 1 | 4 | 6 | 4 | 1 | 0 | 0 |
| 2 * D(n) | 0 | 0 | 0 | 1 | −1 | 0 | 0 | 0 | 0 |
| K(n) | 0 | 0 | 0 | 0 | 1 | 0 | 0 | 0 | 0 |
| 16 * P(n) | 0 | 0 | 1 | 4 | 6 | 4 | 1 | 0 | 0 |
| 128 * Q(n) | 0 | −1 | −9 | −37 | −93 | 93 | 37 | 9 | 1 |
| 512 * L(n) | 1 | 8 | 28 | 56 | 326 | 56 | 28 | 8 | 1 |

Other kernels can be used and the kernel sizes are determined by the user's desire to fine-tune the edge shapes.

Figure 5:
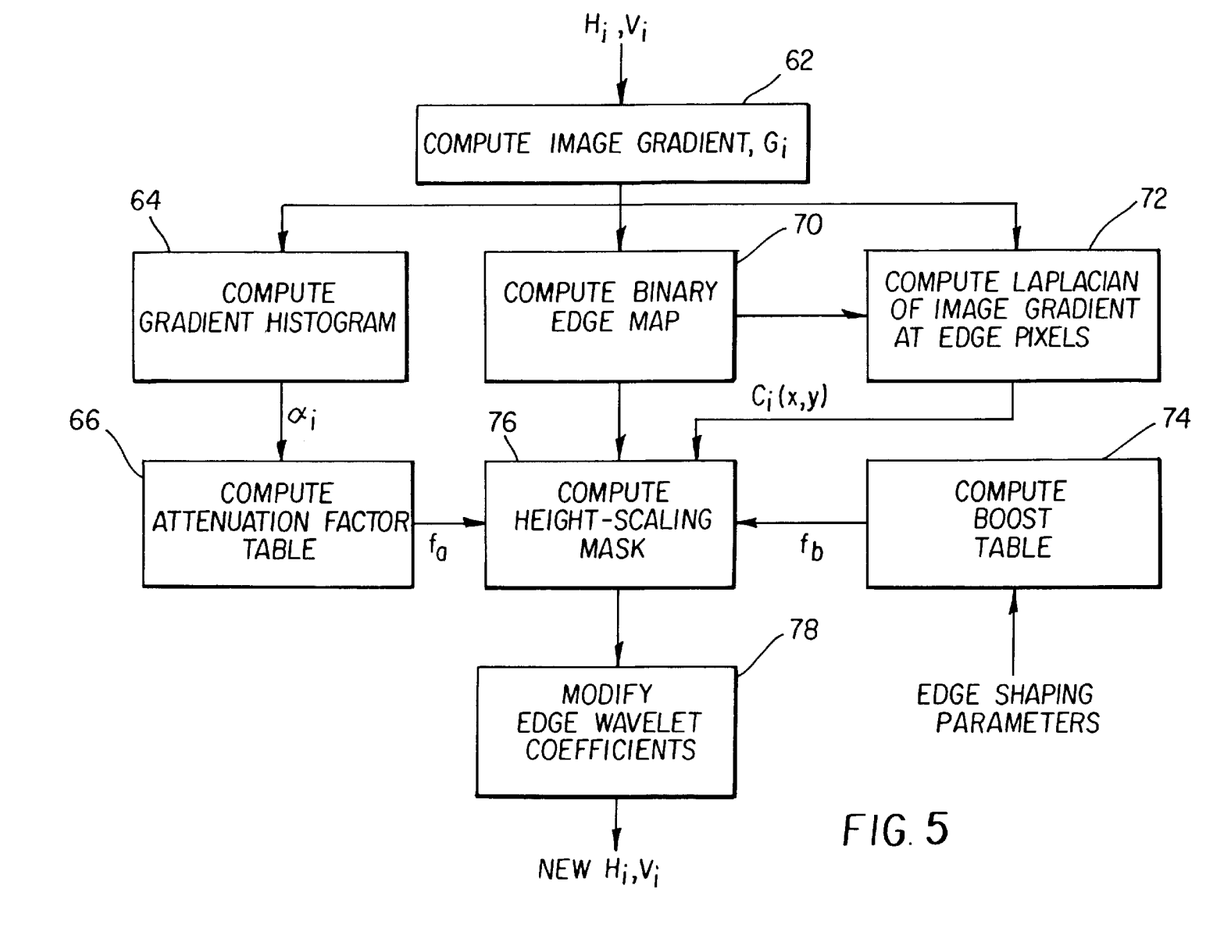
FIG. 5 is a flow chart showing how the wavelet coefficient-scaling mask is generated according to the present invention.
Figure 6:
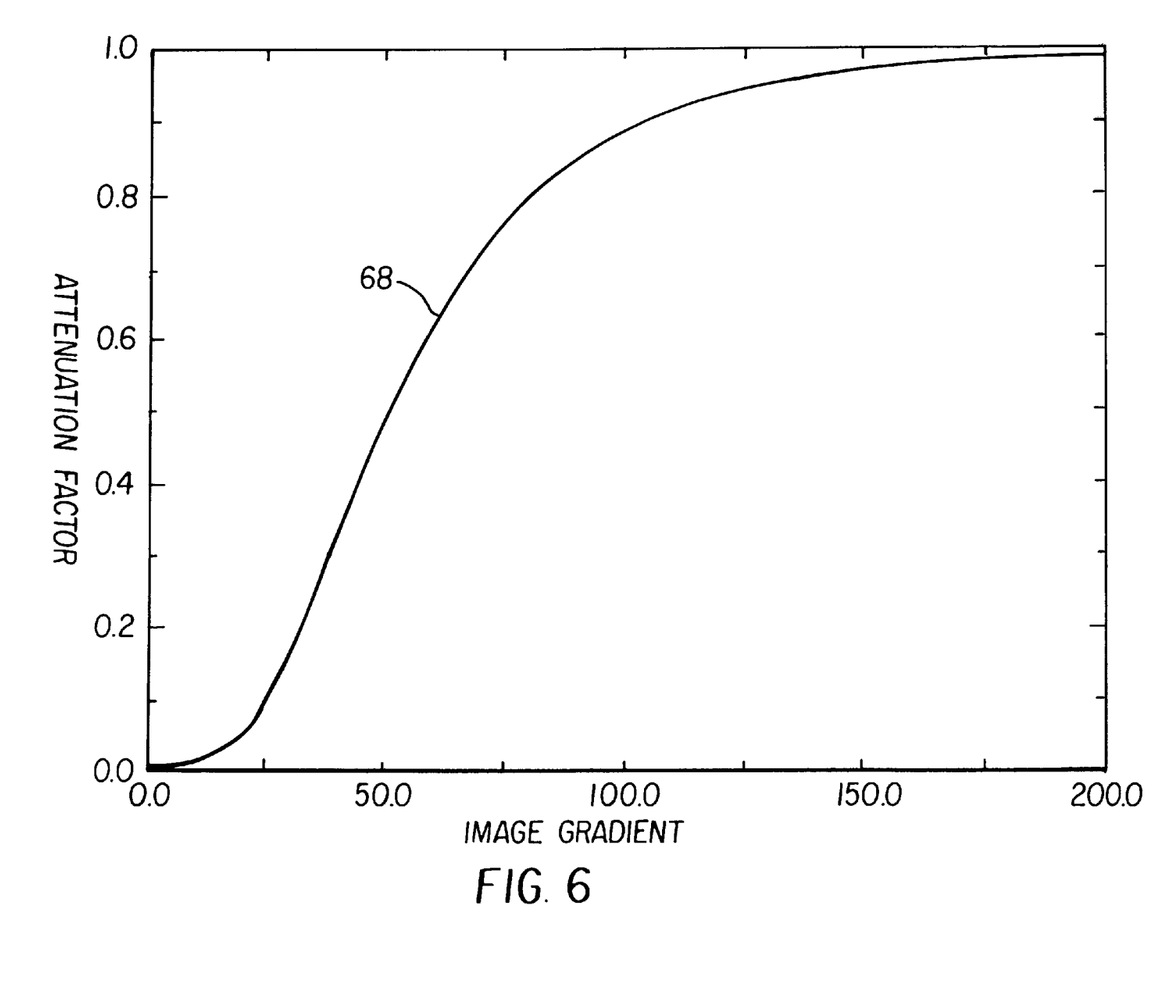
FIG. 6 is a graph showing an example of the attenuation factor table used in the present invention.

Referring to FIG. 5 the way that the partial derivatives (wavelet coefficients) are modified at each resolution i will be described. First, the partial derivatives, $H_i(x,y)$ and $V_i(x,y)$, are used to compute 62 an image gradient $G_i=\sqrt{H_i^2+V_i^2}$. A histogram is then computed 64 from the image gradient. The gradient having the highest count in the gradient histogram is designated $\gamma_i$ and is used as an estimate of noise level at this resolution, i. Based on $\gamma_i$, an attenuation factor table, $\alpha_i(G_i,\gamma_i)$, is constructed 66, so that for each gradient value $G_i$, there is an attenuation factor, $f_a=\alpha_i(G_i,\gamma_i)$. In the preferred embodiment of the invention, the attenuation factor table is implemented with the following functional form:

$$f_a = \frac{G_i^n}{G_i^n + (\alpha_i \gamma_i)^n}.$$

where $\alpha_i$ and n are chosen based on the type of noise present in the image at that resolution. If noise is highly correlated from pixel to pixel, $\alpha_i$ is decreased. For white noise, $\alpha_i$ should set at 2.5 or higher. For most images, n is not a sensitive parameter and n=3.0 is a good choice. FIG. 6 is a plot 68 of a representative attenuation factor table, showing the absolute value of the image gradient vs. the attenuation factor.

A binary edge map is computed 70 by locating directional local maximum points on the image gradient. This process is well known in the prior art (see, for example, the paper by H.-C. Lee and D. R. Cok, "Detecting boundaries in a vector field," *IEEE Transactions on Signal Processing*, pp. 1181–1194, May 1991). A pixel is labeled as an edge pixel if its image gradient is a local maximum along its gradient direction. For each edge pixel, its gradient curvature, $C_i(x, y)$, is computed 72 as the Laplacian of the image gradient, normalized by the gradient value, i.e., $$C_i(x,y) = |\nabla^2 G_i(x,y)|/G_i(x,y)$$

Figure 7:
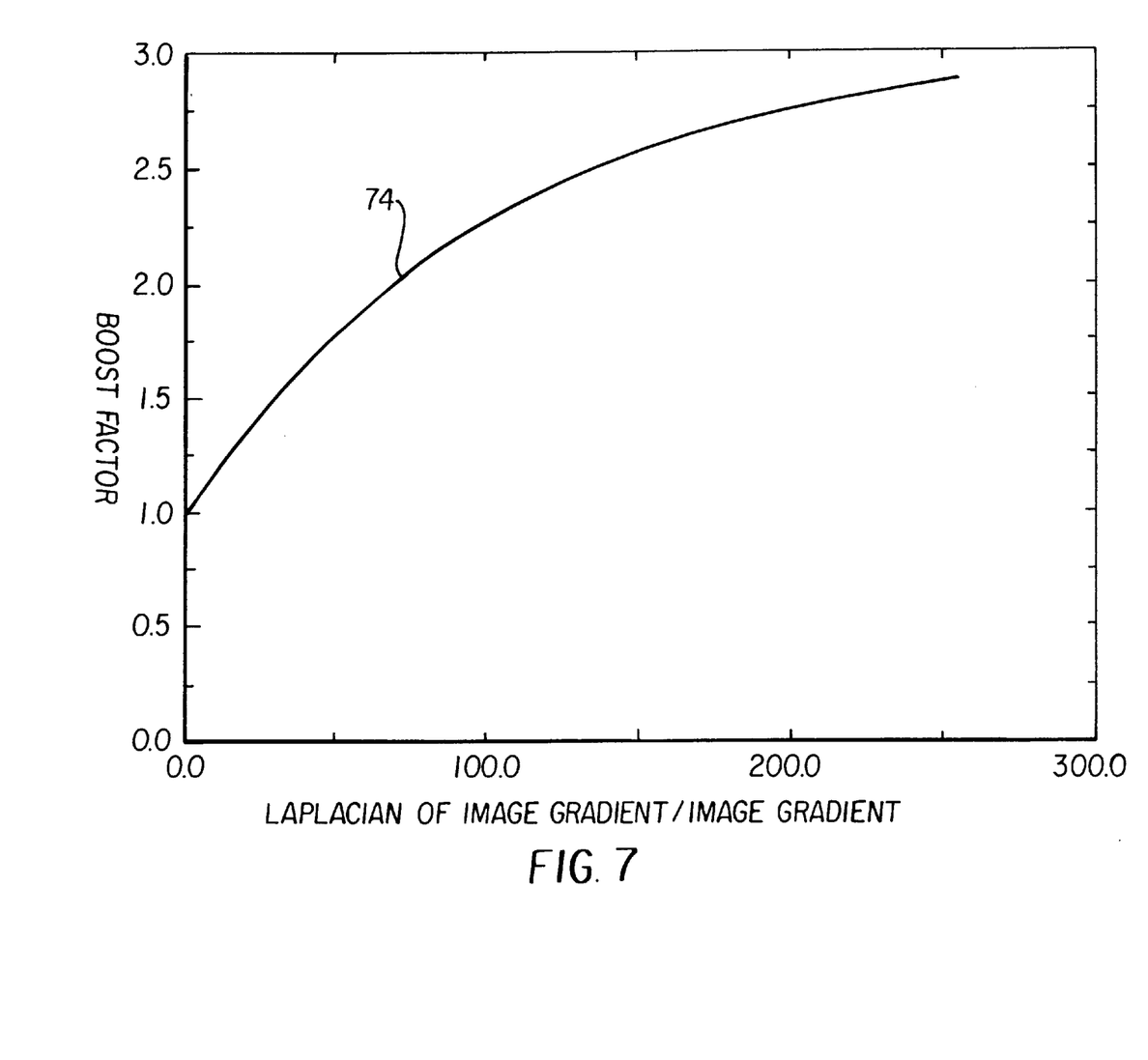
FIG. 7 is a graph showing an example of the boost factor table used in the present invention.

When $G_i(x,y)$ is smaller than a threshold, $\tau_i$, it is set to $\tau_i$ to avoid division by zero. The threshold is not sensitive, and setting $\tau_i = 0.1\gamma_i$ works well for most applications. Gradient curvature, $C_i$, is an intrinsic property of an edge because it does not depend on image metric scale. It measures the spatial extent of an edge and therefore is a very good indicator of how sensitive an edge is to image blur. For image enhancement, an edge should be sharpened more if its gradient curvature is larger. A boost factor table, $b_i(C_i, U_i)$, is constructed from a user specified set of edge shaping parameters, $U_i$, such that for each gradient curvature value, $C_i$, there is a boost factor $f_b = b_i(C_i, U_i)$. In the preferred embodiment of the invention, the boost factor table is implemented with the following functional form:

$$f_b = A_i(1 - e^{-\beta_i C_i}) + b_i,$$

where $A_i$, $b_i$, and $\beta_i$ constitute the user specified set of parameters, $U_i$. Although selection of parameters in $U_i$ varies according to the objective of each image enhancement application, a simple criterion to set parameter values is to make an occlusion boundary in the image as sharp as an ideal step edge. FIG. 7 is a plot 74 of the values of a representative boost factor table showing the absolute value of the Laplacian of the image gradient normalized by the image gradient, vs. boost factor.

Returning to FIG. 5, for each edge pixel $(x_e, y_e)$ on the edge map, a wavelet coefficient-scaling mask $m_i(x_e, y_e)$ is computed 76 as the product of the attenuation factor and the boost factor at that pixel, i.e., $$m_i(x_e, y_e) = f_a(G_i(x_e, y_e), \gamma_i) \cdot f_b(C_i(x_e, y_e), U_i)$$

The value of the wavelet coefficient-scaling mask $m_i(x,y)$ at a non-edge pixel $(x,y)$ is determined from all the neighboring edge pixels within a window $W_i$ centered at $(x,y)$. Each edge pixel contributes some wavelet coefficient-scaling factor to $(x,y)$ and the wavelet coefficient-scaling factor $m_i(x,y)$ is calculated as the average of contributions from all the neighboring edge pixels in the window. Let $(x_e, y_e)$ be an edge pixel in the window $W_i(x,y)$. Let $G_i(x,y)$ and $G_i(x_e, y_e)$ be the image gradients at $(x,y)$ and $(x_e, y_e)$, respectively. The contribution from an edge pixel $(x_e, y_e)$ to a non-edge pixel $(x,y)$ is computed as follows:

$$h_i(x, y, x_e, y_e) = m_i(x_e, y_e)\left[1.0 - \lambda_i \frac{G_i(x_e, y_e) - G_i(x, y)}{G_i(x, y)}\right],$$

where $\lambda_i$ is a user specified parameter. Typical value of $\lambda_i$ is about 0.2. In most applications, the value of $h_i(x,y,x_e,y_e)$ is constrained to be greater than or equal to 1.0. If the calculated value is less than 1.0, then it is set to 1.0. In special cases where noise suppression is desired, $h_i(x,y,x_e,y_e)$ can be constrained to have a value greater than 0.5 or some other user specified value. The wavelet coefficient-scaling factor of a non-edge pixel is calculated as:

$$m_i(x, y) = \frac{1}{M} \sum_{(x_e, y_e) \in W_i(x, y)} h_i(x, y, x_e, y_e),$$

where M is the total number of neighboring edge pixels in the window $W(x,y)$.

Once the wavelet coefficient-scaling mask $m_i(x,y)$ is determined, the partial derivatives, $H_i(x,y)$ and $V_i(x,y)$, are modified 78 by the following formulas to produce the new partial derivatives, $H_i'(x,y)$ and $V_i'(x,y)$:

$$H_i'(x,y) = m_i(x,y) \cdot H_i(x,y)$$

$$V_i'(x,y) = m_i(x,y) \cdot V_i(x,y).$$

The desired output image is then reconstructed from $H_i'(x,y)$ and $V_i'(x,y)$, i=1, 2, ..., N, by the inverse edge-wavelet transform as shown in FIG. 4.

Figure 8:
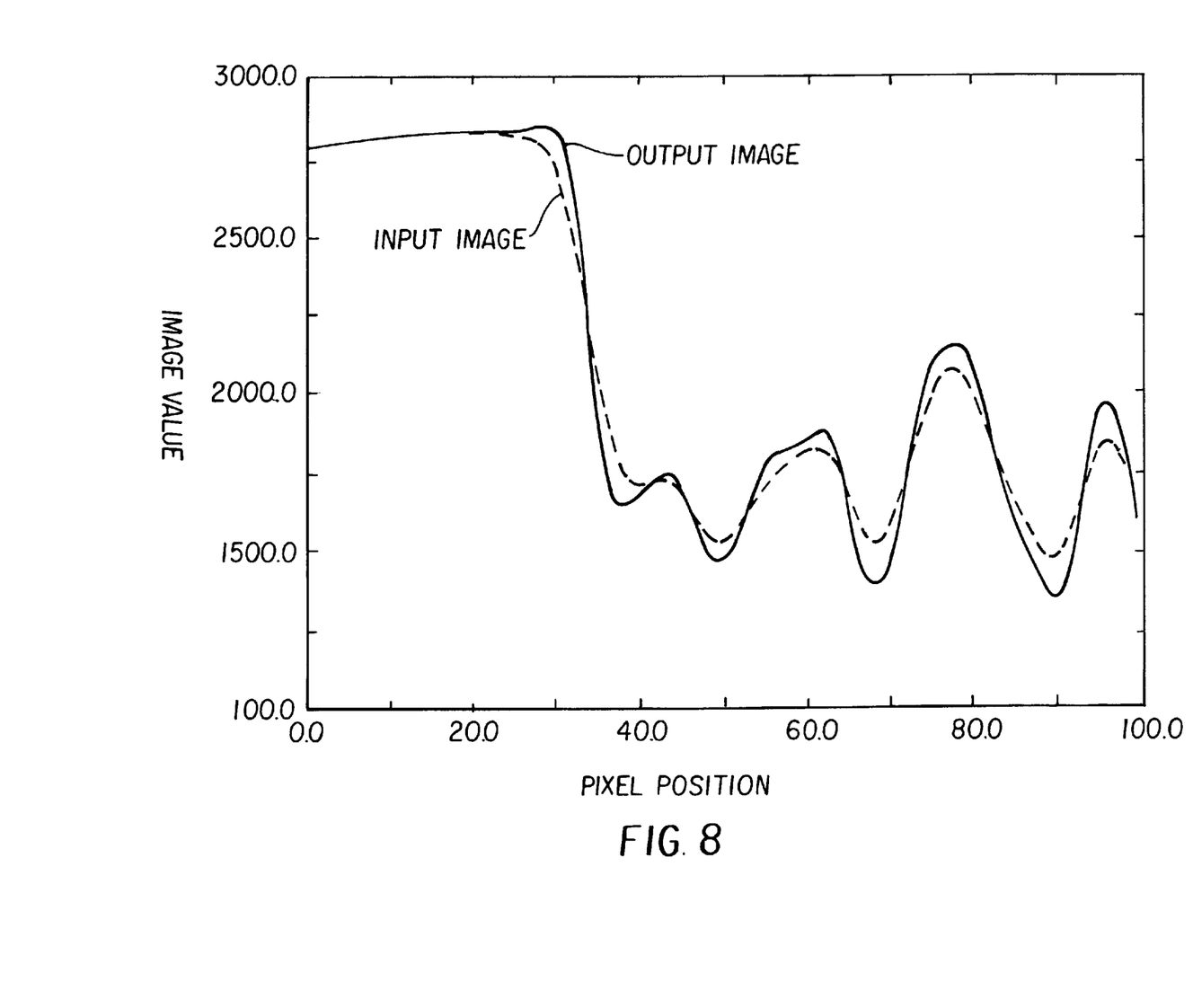
FIG. 8 is a comparison of the intensity profile (image code values) of a line in an image containing an edge before and after being processed according to the edge shaping method of the present invention.

The perceived contrast of edges and texture details in the output image is greatly enhanced by the edge shaping operation of this invention. FIG. 8 shows a comparison between an image edge having texture detail on the right of the edge before and after edge shaping. The dashed curve represents the intensity profile of a line through the input image. The solid curve shows the intensity profile of the same line after the input image is processed through the edge shaping operation of the invention. The major edge transition on the left half has become much steeper without obvious overshoot or undershoot. The signal modulation of the texture details on the right of the edge has also been greatly enhanced.

The invention has been described with reference to a preferred embodiment. However, it will be appreciated that variations and modifications can be effected by a person of ordinary skill in the art without departing from the scope of the invention.

PARTS LIST

10 transform step
12 modify wavelet coefficient step
14 inverse transform step
16 color space transform step
18 apply present invention to image step
20 color space inverse transform step
22 input image
24 convolve input image with smoothing filter step
26 smoothing filter
28 blurred image
32 differentiation filter
34 horizontal partial derivative
38 differentiation filter
40 vertical partial derivative
42 further blurred subsampled image
44 horizontal wavelet coefficients of once blurred image
46 vertical wavelet coefficients of once blurred image 48 residual image
50 horizontal wavelet coefficient of twice blurred image
52 vertical wavelet coefficient of twice blurred image
54 reconstruction filter for blurred image
56 reconstruction filter for horizontal wavelet coefficients
58 reconstruction filter for vertical wavelet coefficients
60 summing step
62 computing image gradient step
64 compute histogram step
66 construct gradient factor table step
68 plot of attenuation factor table values
70 compute binary edge map step
72 compute pixel gradient curvature step
74 plot of boost factor table values
76 compute scaling mask step
78 modify wavelet coefficients step

What is claimed is:

1. A digital image processing method, comprising the steps of:
   a) transforming a digital image using an edge sensitive wavelet transform to produce a plurality of wavelet coefficients at various resolutions and a residual image;
   b) modifying the wavelet coefficients as a function of the rate of change of the image gradient at a resolution corresponding to the respective wavelet coefficient, wherein the rate of change comprises an image gradient curvature that is computed by applying a Laplacian operator to the image gradient, thereby generating a modification factor that is invariant to scaling of the image; and
   c) inverse transforming the modified wavelet coefficients and the residual image to produce a processed digital image.

2. The method claimed in claim 1, wherein the edge sensitive wavelet transform is a Mallat-Zhong edge-wavelet.

3. The method claimed in claim 1, wherein the rate of change of the gradient is determined as the normalized Laplacian of the gradient of the image at the respective resolution.

4. The method claimed in claim 1, wherein the function of the rate of change of the gradient at resolution i, has the functional form:

$$f_b = A_i(1-e^{-\beta_i C_i})+b_i,$$

where, $A_i$, $b_i$ and $\beta_i$ are user specified parameters, $$C_i = \left|\frac{\nabla^2 G_i}{G_i}\right|,$$

where $G_i = \sqrt{H_i^2 + V_i^2}$, and $$H_i = \frac{\partial B_{i-1}}{\partial x},$$

$$V_i = \frac{\partial B_{i-1}}{\partial y},$$

$B_i$ is the digital image at the respective resolution, $\beta_i$ depends on the metric used for the digital image, such as log exposure, printing density, or linear exposure, and the wavelet coefficients are multiplied by $f_b$.

5. The method claimed in claim 4, wherein:
   $0.8 < b_i < 1.5$;
   $1.0 < A_i < 3.0$;
   the metric is log exposure where $2.0 < \beta_i < 4.0$.

6. The method claimed in claim 1, wherein the function of the gradient at resolution i has the functional form:

$$f_a = \frac{G_i^n}{G_i^n + (\alpha_i \gamma_i)^n},$$

where $\alpha_i$ and n are chosen based on the type of noise present in the image at resolution i, $\gamma_i$ represents the gradient having the highest count in a gradient histogram, and $G_i = \sqrt{H_i^2 + V_i^2}$, $$H_i = \frac{\partial B_{i-1}}{\partial x},$$

$$V_i = \frac{\partial B_{i-1}}{\partial y},$$

and $B_i$ is the digital image at resolution i.

7. The method claimed in claim 1, wherein the wavelet coefficients are modified by applying a wavelet coefficient-scaling mask $m_i(x,y)$.

8. The method claimed in claim 7, wherein the wavelet coefficient-scaling mask is generated by:
   a) forming an edge map by locating directional local maximum points of the image gradient and labeling pixels $(x_e, y_e)$ in the edge map as edge pixel if the gradient is a local maximum along the gradient direction;
   b) computing the values of the wavelet coefficient-scaling mask $m_i(x_e, y_e)$ at edge pixels $(x_e, y_e)$ as the product of an attenuation factor $f_a$ and a boost factor $f_b$; and
   c) computing the values of the wavelet coefficient scaling mask at non-edge pixels as the average of contributions from neighboring edge pixels.

9. The method claimed in claim 8, wherein the attenuation factor $f_a$ is implemented with the following functional form $$f_a = \frac{G_i^n}{G_i^n + (\alpha_i \gamma_i)^n},$$

where $\gamma_i$ represents the gradient having the highest count in a gradient histogram, ($\alpha_i$ and n are chosen based on the type of noise present in the image at that resolution, and $G_i = \sqrt{H_i^2 + V_i^2}$; and the boost factor $f_b$ is implemented with the following functional form $$f_b = A_i(1-e^{-\beta_i C_i})+b_i,$$

where $A_i$, $b_i$, and $\beta_i$ are user specified parameters, and $C_i$ is the gradient curvature.

10. A computer program product for a digital image processing method comprising: a computer readable storage medium having a computer program stored thereon for performing the steps of:
   a) transforming a digital image using an edge sensitive wavelet transform to produce a plurality of wavelet coefficients at various resolutions and a residual image;
   b) modifying the wavelet coefficients as a function of the rate of change of the image gradient at a resolution corresponding to the respective wavelet coefficient, wherein the rate of change comprises an image gradient curvature that is computed by applying a Laplacian operator to the image gradient, thereby generating a modification factor that is invariant to scaling of the image; and
   c) inverse transforming the modified wavelet coefficients and the residual image to produce a processed digital image.

* * * * *